United States Patent
Yang (10) Patent No.: US 8,793,016 B2
(45) Date of Patent: Jul. 29, 2014

(54) HEXAPOD ROBOT DEVICE

(75) Inventor: Chih-Hsiung Yang, Kaohsiung (TW)

(73) Assignee: National Kaohsiung University of Applied Science, Kaohsiung (TW)

(*) Notice: Subject to any disclaimer, the term of this patent is extended or adjusted under 35 U.S.C. 154(b) by 517 days.

(21) Appl. No.: 13/218,642

(22) Filed: Aug. 26, 2011

(65) Prior Publication Data

US 2012/0259461 A1    Oct. 11, 2012

(30) Foreign Application Priority Data

Apr. 11, 2011   (TW) .............................. 100112369 A (51) Int. Cl.
*B25J 9/00*    (2006.01)
*B62D 57/032*   (2006.01)

(52) U.S. Cl.
USPC ............ 700/245; 700/255; 700/260; 180/8.1; 180/8.6; 180/8.5; 446/330; 446/353; 446/368; 318/568.16; 318/568.17; 318/568.2

(58) Field of Classification Search
USPC ............. 700/245, 255, 260; 180/8.1, 8.6, 8.5; 446/330, 353, 368; 318/568.16, 318/568.17, 568.2
See application file for complete search history.

(56) References Cited

U.S. PATENT DOCUMENTS

| | | | | |
|---|---|---|---|---|
| 5,219,410 | A * | 6/1993 | Garrec | 180/8.1 |
| 5,901,936 | A * | 5/1999 | Bieg | 248/370 |
| 6,481,513 | B2 | 11/2002 | Buchler et al. | |
| 6,636,781 | B1 * | 10/2003 | Shen et al. | 700/248 |
| 6,671,975 | B2 * | 1/2004 | Hennessey | 33/645 |
| 6,681,150 | B1 * | 1/2004 | Haga et al. | 700/245 |
| 6,964,309 | B2 * | 11/2005 | Quinn et al. | 180/8.1 |
| 7,249,640 | B2 * | 7/2007 | Horchler et al. | 180/8.6 |
| 7,603,199 | B2 * | 10/2009 | Takenaka et al. | 700/245 |

FOREIGN PATENT DOCUMENTS

TW    348674    12/1998
WO    99/28095   6/1999

* cited by examiner

*Primary Examiner* — Ronnie Mancho
(74) *Attorney, Agent, or Firm* — Alan D. Kamrath; Kamrath IP Lawfirm, P.A.

(57) ABSTRACT

A hexapod robot device includes a main body and six legs coupled thereto. Each leg has a first connecting rod pivotally connected with the main body, a first driver electrically pivotally connected between the main body and the first connecting rod, with the first driver controllably driving the first connecting rod to move forward and backward along a longitudinal direction, a second connecting rod pivotally connected with the first connecting rod, and a second driver pivotally connected between the first connecting rod and the second connecting rod, with the second driver controllably driving the second connecting rod to move upward and downward along a vertical direction. The second connecting rod further has an end to engage with the ground.

20 Claims, 9 Drawing Sheets

HEXAPOD ROBOT DEVICE

BACKGROUND OF THE INVENTION

1. Field of the Invention

The present invention relates to a hexapod robot device. More particularly, the present invention relates to the hexapod robot device having six legs each of which is controlled to generate a combined horizontal and vertical movement.

2. Description of the Related Art

Taiwanese Patent Pub. No. 348674, entitled "Autonomous hexapod robot," discloses an all-terrain obstacle-avoidance hexapod robot. The hexapod robot includes six leg mechanisms (provided with six drivers), a battery, an electrical controller and an obstacle-avoidance device. The obstacle-avoidance is operated to control the hexapod robot to step back while encountering obstructions and to further wind through the obstructions by turning the hexapod robot to the left or right side.

PCT Pub. No. WO99/28095, entitled "System and method for compensating for compliance of a hexapod positioning device," discloses a system and method for compensating for compliance distortions in a positioning device, such as a hexapod machining center. The position device has a movable platform mounted on a plurality of actuators at a plurality of pivot locations. The method comprises the steps of: calculating compliance information of the positioning device: compensating actuator movement commands according to the collected compliance information; and moving the positioning device actuators according to the compensated movement commands.

PCT Pub. No. WO99/28097, entitled "System and method for calibrating a hexapod positioning device," discloses a system and method for calibrating a positioning device, such as a hexapod machining center. The system comprises a gage nest, having a plurality of sensors and being connected to the positioning device; an artifact, disposed in a work area defined by the positioning device; a first computer, connected to said positioning device, for controlling and recording precision movements of the positioning device with respect to the artifact; and a second computer for using the recorded precision movement as input data in order to simulate the operation of the positioning device, thereby iteratively determining the actual geometry of the positioning device.

U.S. Pat. No. 6,481,513, "Single actuator per leg robotic hexapod," discloses a mobile robot comprising a body and at least six compliant legs each having only one actuator. The compliant legs are mounted to the body for movement relative thereto in a single degree of freedom. A controller is operably coupled to the actuator of each compliant leg, the controller selectively actuates the actuators to drive the compliant legs in an alternating tripod gait.

However, the above-mentioned patents are absent a hexapod robot that has a leg controlled to generate a combined horizontal and vertical movement. The above-mentioned patents are incorporated herein by reference for purposes including, but not limited to, indicating the background of the present invention and illustrating the state of the art.

As is described in greater detail below, the present invention provides a hexapod robot device. Each leg has a first connecting rod operated to move forward and backward along a longitudinal direction and a second connecting rod operated to move upward and downward along a vertical direction. The first connecting rod and the second connecting rod are assembled to provide a combined horizontal and vertical movement in such a way as to mitigate and overcome the above problem.

SUMMARY OF THE INVENTION

The primary objective of this invention is to provide a hexapod robot device. Each leg has a first connecting rod operated to move forward and backward along a longitudinal direction and a second connecting rod operated to move upward and downward along a vertical direction. The leg assembled with the first connecting rod and the second connecting rod provides a combined horizontal and vertical movement. Accordingly, the hexapod robot device is successful in easily passing through obstructions.

The hexapod robot device in accordance with an aspect of the present invention includes:

a main body provided with an operation controller; and six legs coupled to the main body, each including:

a first connecting rod pivotally connected with the main body;

a first driver electrically connected with the operation controller and pivotally connected between the main body and the first connecting rod, with the first driver controllably driving the first connecting rod to move forward and backward along a longitudinal direction;

a second connecting rod pivotally connected with the first connecting rod; and a second driver electrically connected with the operation controller and pivotally connected between the first connecting rod and the second connecting rod, with the second driver controllably driving the second connecting rod to move upward and downward along a vertical direction;

wherein the second connecting rod has an end to engage with the ground.

In a separate aspect of the present invention, the first driver and the second driver are selected from a servo motor.

In a further separate aspect of the present invention, the second connecting rod includes a first micro switch to detect whether the end of the second connecting rod stably engaged with the ground.

In yet a further separate aspect of the present invention, the hexapod robot device further includes a wireless transmission module electrically connected with the operation controller to communicate with a remote computer device.

In yet a further separate aspect of the present invention, the hexapod robot device further includes a monitoring system which includes a turntable-and-extendible arm and a camera device connected thereto.

In yet a further separate aspect of the present invention, the hexapod robot device further includes a grapple arm system to catch an object.

In yet a further separate aspect of the present invention, the grapple arm system includes at least one second micro switch to detect a catching action of the grapple arm system.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a hexapod robot device in accordance with a preferred embodiment of the present invention is suitable for all terrain purposes, including passages of rugged terrain and obstacle terrain or operation in dangerous situation (e.g. natural disaster inspection or bomb blasting operation) which are not limitative of the present invention. Furthermore, the hexapod robot device in accordance with the preferred embodiment of the present invention is combined with other operation systems, for example: a robotic arm sampling system or a monitoring system.

Figure 1:
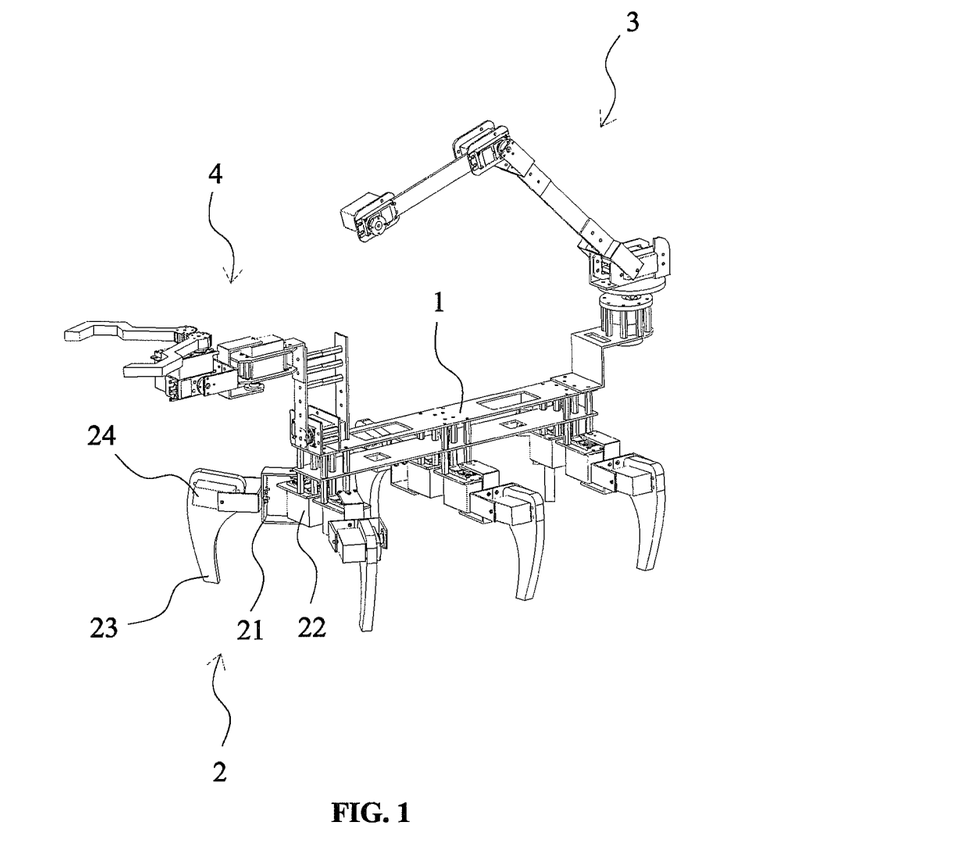
FIG. 1 is a perspective view of a hexapod robot device in accordance with a preferred embodiment of the present invention.
Figure 1A:
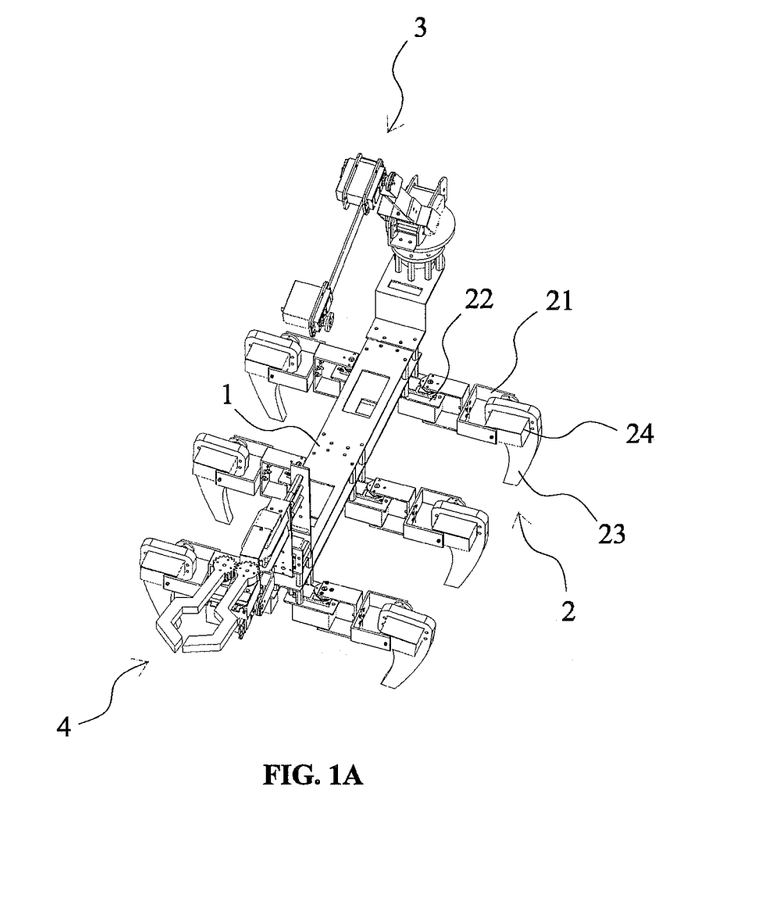
FIG. 1A is another perspective view of the hexapod robot device in accordance with the preferred embodiment of the present invention.
Figure 2:
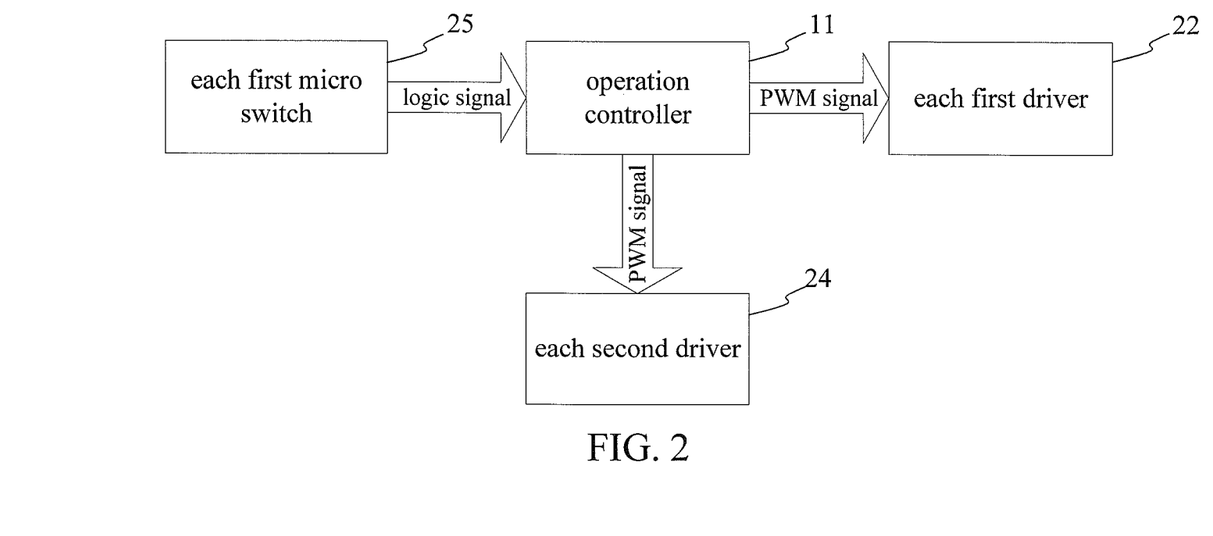
FIG. 2 is a schematic block diagram of the hexapod robot device in accordance with the preferred embodiment of the present invention.

FIG. 1 shows a perspective view of a hexapod robot device in accordance with a preferred embodiment of the present invention. FIG. 1A shows another perspective view of the hexapod robot device in accordance with the preferred embodiment of the present invention, depicted in FIG. 1. FIG. 2 shows a schematic block diagram of the hexapod robot device in accordance with the preferred embodiment of the present invention, applied in that depicted in FIGS. 1 and 2.

Referring to FIGS. 1, 1A and 2, the hexapod robot device includes a main body 1 and six legs 2. The three legs 2 are coupled to a front position, a middle position and a rear position arranged at a left side of the main body 1 as a front left leg, a middle left leg and a rear left leg and are aligned with each other. The other three legs 2 are coupled to a front position, a middle position and a rear position arranged at a right side of the main body 1 as a front right leg, a middle right leg and a rear right leg and aligned with each other. Each of the legs 2 assembled on the main body 1 are spaced apart to provide an adequate space for processing a crawling action.

With continued reference to FIGS. 1, 1A and 2, the main body 1 is provided with an operation controller 11, as best shown in FIG. 2, electrically connected with each of the six legs 2. Each leg 2 includes a first connecting rod 21, a first driver 22, a second connecting rod 23 and a second driver 24. In a preferred embodiment, the first driver 22 and the second driver 24 are selected from a servo motor.

Still referring to FIGS. 1, 1A and 2, the first connecting rod 21 pivotally connects with the main body 1 and the first driver 22 pivotally connects between the main body 1 and the first connecting rod 21. The first driver 22 electrically connects with the operation controller 11 such that the first driver 22 is operated to controllably drive the first connecting rod 21 to move forward and backward along a longitudinal direction with respect to the main body 1. In operation, the forward and backward movements of the legs 2 within a range of angles carry the main body 1 for moving forward and backward on the ground.

Still referring to FIGS. 1, 1A and 2, the second connecting rod 23 further pivotally connects with the first connecting rod 21 and the second driver 24 pivotally connects between the first connecting rod 21 and the second connecting rod 23. Furthermore, the second connecting rod 23 has an end to engage with the ground. The second driver 24 electrically connects with the operation controller 11 such that the second driver 24 is operated to controllably drive the first connecting rod 21 to move upward and downward along a vertical direction with respect to the main body 1. In operation, the upward and downward movements of the legs 2 within a range of angles carry the main body 1 for moving upward and downward on the ground.

Still referring to FIGS. 1, 1A and 2, the first driver 22 and the second driver 24 are controlled to continuously operate the assembly of the first connecting rod 21 and the second connecting rod 23 such that forward (or backward) actions of the first connecting rod 21 combined with upward (or backward) actions of the second connecting rod 23 are alternative to provide a combined horizontal and vertical movement for processing a stride of the leg 6. One of the left legs 2 and two of the right legs 2 are grouped into a first group and others are grouped into a second group. In crawling operation, while the first group of the three legs 2 are off the ground and simultaneously operated to move forward or backward, the second group of the other three legs 2 arranged at both sides of the main body 1 are still stably supporting the main body 1 on the ground as a triangular support. Consequently, the first group and the second group of the legs 2 are alternatively operated to move forward or backward so that the hexapod robot device is suitable for passing through a rugged terrain, a steep slope or a ladder-shaped floor.

Still referring to FIGS. 1, 1A and 2, the operation controller 11 is selected from a single chip of ATmega8535 IC produced by ATMEL Cooperation in U.S. The second connecting rod 23 includes a first micro switch 25, as best shown in FIG. 2, which is operated to detect a feedback signal caused by engaging the end of the second connecting rod 23 with the ground.

Figure 3:
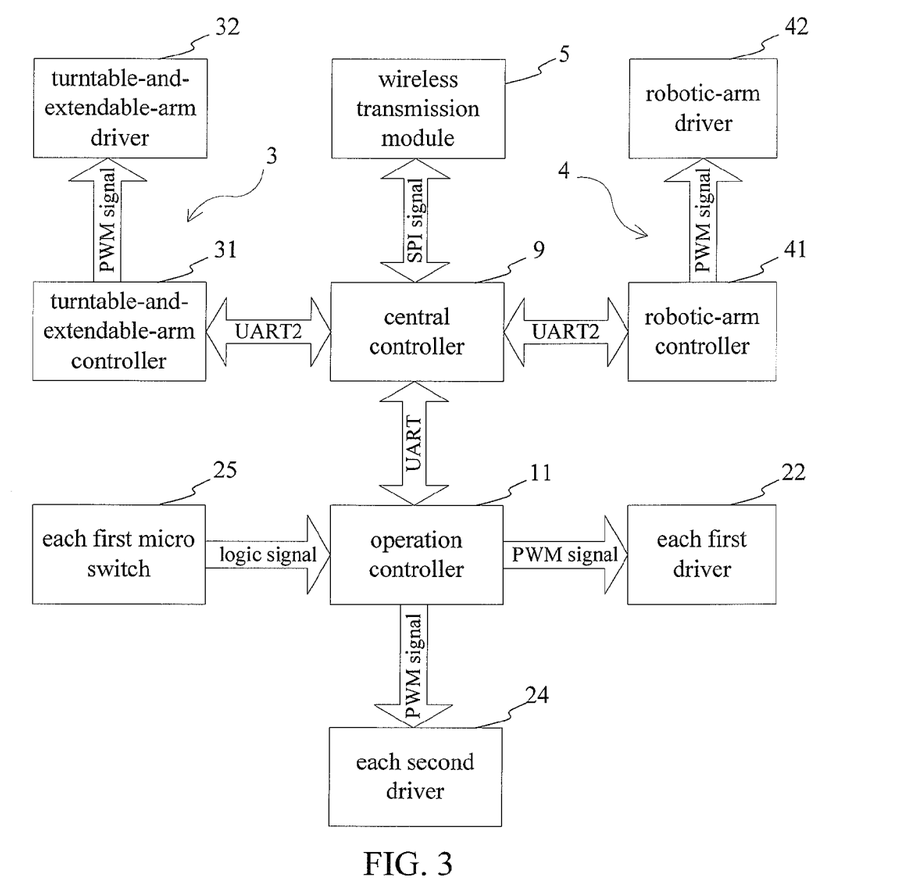
FIG. 3 is a schematic block diagram of the hexapod robot device combined with a monitoring system and a grapple system in accordance with another preferred embodiment of the present invention.

Turning now to FIG. 3, a schematic block diagram of the hexapod robot device in accordance with another preferred embodiment of the present invention is shown. Referring again to FIGS. 1, 1A and 3, the hexapod robot device further includes a monitoring system 3, a grapple arm system 4, a wireless transmission module 5 and a central controller 9. The monitoring system 3 and the grapple arm system 4 mechanically connect with the main body 1, as best shown in FIG. 1A. The central controller 9 electrically connects with the monitoring system 3, the grapple arm system 4 and the wireless transmission module 5 which are controllably operated. In a preferred embodiment, the central controller 9 is selected from a single chip of ATMega162V IC produced by ATMEL Cooperation in U.S. In addition, the central controller 9 further connects with the operation controller 11, thereby controlling the operation controller 11.

With continued reference to FIGS. 1, 1A and 3, the monitoring system 3 includes a turntable-and-extendible arm and a camera device connected thereto, as best shown in FIGS. 1 and 1A. The monitoring system 3 further includes a turntable-and-extendible-arm controller (i.e. a single of ATMega88V IC) 31 and a turntable-and-extendible-arm driver 32, as best shown in FIG. 3 such that the turntable and extendible arm is adjusted to move the camera device to a perfect angle and a perfect position.

Still referring to FIGS. 1, 1A and 3, the grapple arm system 4 includes a robotic-arm controller (i.e. ATMega8 IC) 41 and a robotic-arm driver 42, as best shown in FIG. 3 such that the grapple arm system 4 is adjusted to move to a perfect position to catch an object. In addition, the grapple arm system 4 further includes at least one second micro switch 42 which is operated to detect a catching action of the grapple arm system 4.

Referring again to FIG. 3, the wireless transmission module 5 is selected from a transmission module of RF2401 produced by Twomass Technology Co., Ltd. The wireless transmission module 5 electrically connects with the central controller 9 and the operation controller 11 so that operational data of the operation controller 11, the turntable-and-extendible-arm controller 31 and the robotic-arm controller 41 are transmitted to a remote computer or a monitoring center.

With continued reference to FIG. 3, operational data of the central controller 9 are further transmitted to a remote computer or a monitoring center by the wireless transmission module 5. By way of example, the wireless transmission module 5 is selected from a Zigbee wireless transmission module under Zigbee protocols. In monitoring, the remote computer is selected from a personal computer communicated with the Zigbee wireless transmission module via a RS-232 interface to communicate with the Zigbee wireless transmission module for transmitting commands or accessing data to the hexapod robot device.

Figure 4A:
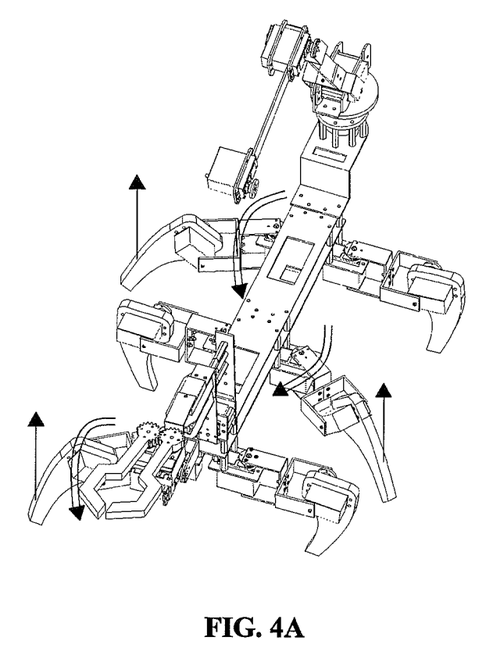
FIGS. 4A-4E are perspective views of a series of crawling actions of the hexapod robot device in accordance with the preferred embodiment of the present invention.
Figure 4B:
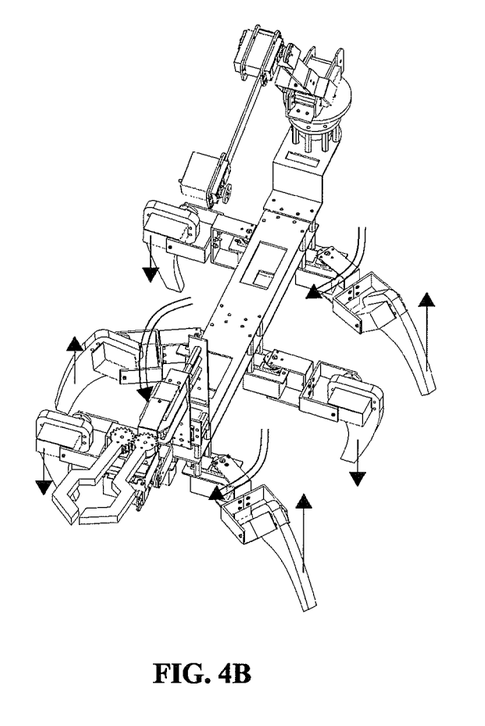
Figure 4C:
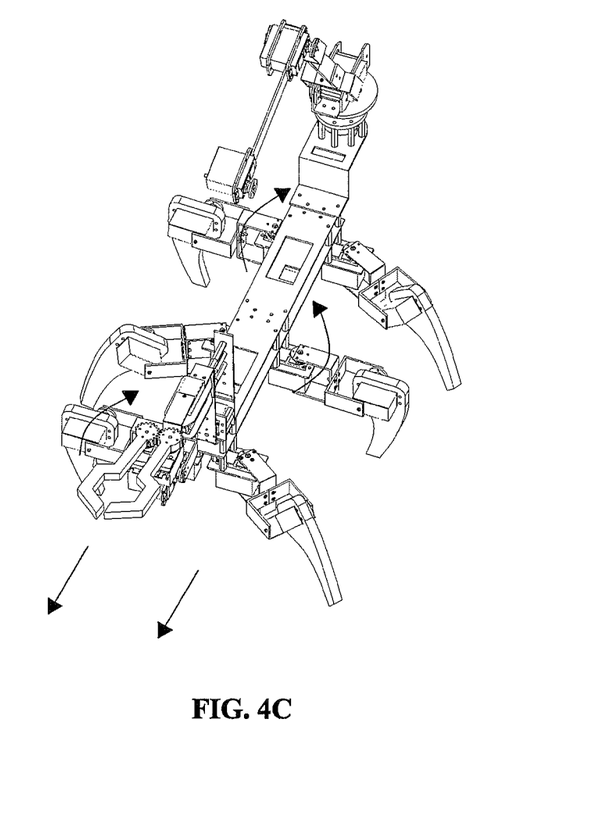

Turning now to FIGS. 4A-4E, five perspective views of a series of crawling actions of the hexapod robot device in accordance with the preferred embodiment of the present invention are shown and are not limitative of the present invention. Referring back to FIG. 1, the hexapod robot device is in a static state and the legs 6 stand on the ground. In FIG. 4A, in the beginning of crawling operation, the first group of the legs is operated to simultaneously move upward and forward, as indicated by upward arrows and forward curved arrows in FIG. 4A. In FIGS. 4B and 4C, the first group of the legs is operated to simultaneously move downward, as indicated by downward arrows in FIG. 4B, and to simultaneously move backward, as indicated by backward curved arrows in FIG. 4C, to claw the ground so as to finish a first forward step of the hexapod robot device.

Figure 4D:
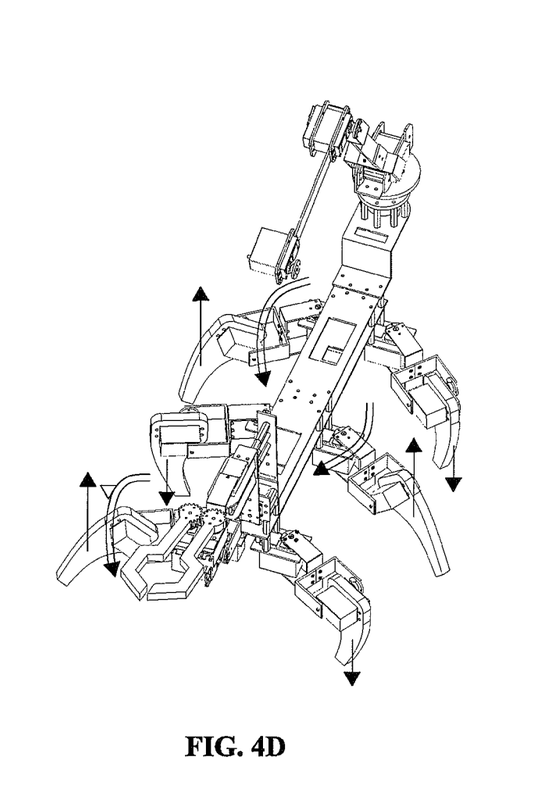
Figure 4E:
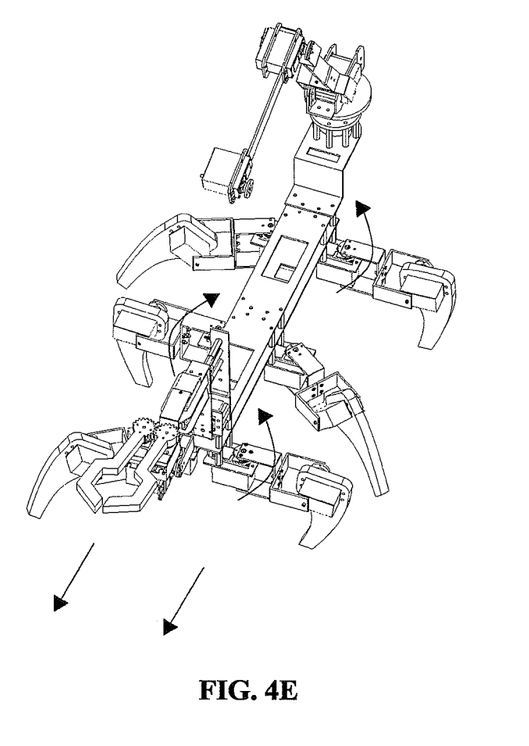

Alternatively, the second group of the legs is operated to simultaneously move upward and forward, as indicated by upward arrows and forward curved arrows in FIG. 4B. In FIGS. 4D and 4E, the second group of the legs is operated to simultaneously move downward, as indicated by downward arrows in FIG. 4D, and to simultaneously move backward, as indicated by backward curved arrows in FIG. 4E, to claw the ground so as to finish a second forward step of the hexapod robot device.

Alternatively, the first group of the legs is further operated to simultaneously move upward and forward, as indicated by upward arrows and forward curved arrows in FIG. 4D, from the ground so as to crawl a third forward step. As previously explained, the second of the leg is further operated to crawl a fourth forward step.

Referring back to FIG. 3, by way of example, a programming panel is operated to scan commands of the hexapod robot device input from a keyboard and to display on a LCD device. The commands input from the programming panel are sent to the central controller 9 by the Zigbee technology via the wireless transmission module 5 and are further sent to the remote computer device by the RS-232 protocol. Alternatively, the commands input from the remote computer device are sent to the programming panel by the RS-232 protocol and are further sent to the central controller 9 by the Zigbee technology via the wireless transmission module 5.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A hexapod robot device comprising:
a main body provided with an operation controller; and
six legs coupled to the main body, each including:
a first connecting rod pivotally connected with the main body;
a first driver electrically connected with the operation controller and pivotally connected between the main body and the first connecting rod, with the first driver controllably driving the first connecting rod to move forward and backward along a longitudinal direction;
a second connecting rod pivotally connected with the first connecting rod; and
a second driver electrically connected with the operation controller and pivotally connected between the first connecting rod and the second connecting rod, with the second driver controllably driving the second connecting rod to move upward and downward along a vertical direction;
wherein the second connecting rod has an end to engage with the ground.

2. The hexapod robot device as defined in claim 1, wherein the first driver and the second driver are selected from a servo motor.

3. The hexapod robot device as defined in claim 1, wherein the second connecting rod includes a first micro switch to detect whether the end of the second connecting rod stably engaged with the ground.

4. The hexapod robot device as defined in claim 1, wherein the hexapod robot device further includes a wireless transmission module electrically connected with the operation controller to communicate with a remote computer device.

5. The hexapod robot device as defined in claim 1, wherein the hexapod robot device further includes a monitoring system which includes a turntable-and-extendible arm and a camera device connected thereto.

6. The hexapod robot device as defined in claim 1, wherein the hexapod robot device further includes a grapple arm system to catch an object.

7. The hexapod robot device as defined in claim 6, wherein the grapple arm system includes at least one second micro switch to detect a catching action of the grapple arm system.

8. A hexapod robot device comprising:
a main body having a left side and a right side;
a front left leg coupled to a front position of the left side of the main body;
a middle left leg coupled to a middle position of the left side of the main body;
a rear left leg coupled to a rear position of the left side of the main body;
a front right leg coupled to a front position of the right side of the main body;
a middle right leg coupled to a middle position of the right side of the main body;
a rear right leg coupled to a rear position of the right side of the main body; and
an operation controller provided on the main body;
wherein the front left leg, the rear left leg and the middle right leg are grouped into a first group and the front right leg, the rear right leg and the middle left leg are grouped into a second group; and
wherein the legs of the first group is operated to move upward and forward or backward by the operation controller while the legs of the second group stably supports the main body on the ground as a first triangular support, alternatively, the legs of the second group is operated to move upward and forward or backward by the operation controller while the legs of the first group stably supports the main body on the ground as a second triangular support.

9. The hexapod robot device as defined in claim 8, wherein each of the front left leg, the middle left leg, the rear left leg, the front right leg, the middle right leg and the rear right leg including:
a first connecting rod pivotally connected with the main body;
a first driver electrically connected with the operation controller and pivotally connected between the main body and the first connecting rod, with the first driver controllably driving the first connecting rod to move forward and backward along a longitudinal direction;
a second connecting rod pivotally connected with the first connecting rod; and
a second driver electrically connected with the operation controller and pivotally connected between the first connecting rod and the second connecting rod, with the second driver controllably driving the second connecting rod to move upward and downward along a vertical direction;
wherein the second connecting rod has an end to engage with the ground.

10. The hexapod robot device as defined in claim 9, wherein the first driver and the second driver are selected from a servo motor.

11. The hexapod robot device as defined in claim 9, wherein the second connecting rod includes a first micro switch to detect whether the end of the second connecting rod stably engaged with the ground.

12. The hexapod robot device as defined in claim 8, wherein the hexapod robot device further includes a wireless transmission module electrically connected with the operation controller to communicate with a remote computer device.

13. The hexapod robot device as defined in claim 8, wherein the hexapod robot device further includes a monitoring system which includes a turntable-and-extendible arm and a camera device connected thereto.

14. The hexapod robot device as defined in claim 8, wherein the hexapod robot device further includes a grapple arm system to catch an object.

15. The hexapod robot device as defined in claim 14, wherein the grapple arm system includes at least one second micro switch to detect a catching action of the grapple arm system.

16. A control method for a hexapod robot device comprising:
coupling a front left leg, a middle left leg and a rear left leg to a front position, a middle position and a rear position of a left side of a main body, respectively;
coupling a front right leg, a middle right leg and a rear right leg to a front position, a middle position and a rear position of a right side of the main body, respectively;
grouping the front left leg, the rear left leg and the middle right leg into a first group and grouping the front right leg, the rear right leg and the middle left leg into a second group;
controlling the legs of the first group to move upward and forward or backward and controlling the legs of the second group to stably support the main body on the ground by an operation controller; and
alternatively controlling the legs of the second group to move upward and forward or backward and controlling the legs of the first group to stably support the main body on the ground by the operation controller.

17. The control method as defined in claim 16, wherein the legs of the first group or the second group are formed as a triangular support.

18. The control method as defined in claim 16, wherein each of the front left leg, the middle left leg, the rear left leg, the front right leg, the middle right leg and the rear right leg including:
a first connecting rod pivotally connected with the main body;
a first driver electrically connected with the operation controller and pivotally connected between the main body and the first connecting rod, with the first driver controllably driving the first connecting rod to move forward and backward along a longitudinal direction;
a second connecting rod pivotally connected with the first connecting rod; and
a second driver electrically connected with the operation controller and pivotally connected between the first connecting rod and the second connecting rod, with the second driver controllably driving the second connecting rod to move upward and downward along a vertical direction;
wherein the second connecting rod has an end to engage with the ground.

19. The control method as defined in claim 18, wherein the first driver and the second driver are selected from a servo motor.

20. The control method as defined in claim 18, wherein the second connecting rod includes a first micro switch to detect whether the end of the second connecting rod stably engaged with the ground.

* * * * *